(12) United States Patent
Hollingshead et al.

(10) Patent No.: US 7,353,609 B2
(45) Date of Patent: Apr. 8, 2008

(54) HOLE LOCATION METHOD AND APPARATUS

(75) Inventors: Paul Charles Hollingshead, Florissant, MO (US); Brandon Heath Wegge, Brentwood, MO (US)

(73) Assignee: Boeing Company, Chicago, IL (US)

( * ) Notice: Subject to any disclaimer, the term of this patent is extended or adjusted under 35 U.S.C. 154(b) by 14 days.

(21) Appl. No.: 11/438,049

(22) Filed: May 19, 2006

(65) Prior Publication Data

US 2007/0266570 A1 Nov. 22, 2007

(51) Int. Cl.
*G01B 21/24* (2006.01)

(52) U.S. Cl. .................. 33/1 G; 33/1 BB; 33/555.1; 702/36

(58) Field of Classification Search .............. 33/1 G, 33/1 BB, 548, 550, 555.1, 613, 645; 702/35, 702/36; 73/865.8
See application file for complete search history.

(56) References Cited

U.S. PATENT DOCUMENTS

| | | | | |
|---|---|---|---|---|
| 3,862,047 A | * | 1/1975 | Weltman et al. | ............... 73/104 |
| 5,027,417 A | * | 6/1991 | Kitakado et al. | ........... 702/158 |
| 6,055,735 A | * | 5/2000 | Weihrauch et al. | ........... 33/203 |
| 6,782,730 B2 | * | 8/2004 | Asanuma | ..................... 73/1.79 |
| 6,792,359 B2 | * | 9/2004 | Ninomiya et al. | ............. 702/35 |
| 6,810,334 B2 | * | 10/2004 | Lee et al. | ...................... 702/35 |
| 6,892,160 B2 | * | 5/2005 | Gooch et al. | ............... 702/150 |
| 6,983,544 B2 | * | 1/2006 | Echizenya | ................. 33/1 BB |
| 7,010,447 B2 | * | 3/2006 | Ninomiya et al. | ............. 702/84 |
| 7,059,055 B2 | * | 6/2006 | Wickham et al. | .......... 33/199 R |
| 2003/0195712 A1 | * | 10/2003 | Ono et al. | ..................... 702/81 |

\* cited by examiner

*Primary Examiner*—G. Bradley Bennett
(74) *Attorney, Agent, or Firm*—Wildman Harrold Allen & Dixon, LLP (57) ABSTRACT

The invention discloses differing embodiments of methods for checking the location or potential location of one or holes in structure relative to edges, fillets, and thickness changes. The area in the vicinity of the hole may be checked in order to determine whether the location or potential location of the hole meets a pre-determined threshold. If the location or potential location of the hole does not meet the pre-determined threshold, the hole may be flagged as being a potential problem. In such manner, the suitability of the hole for insertion of a fastener device may be determined. In other embodiments, apparatus are disclosed having one or more fastener devices extending through one or more holes in a structure. The location of the one or more holes may have been approved for insertion of the one or more fastener devices utilizing a pre-determined threshold standard.

22 Claims, 6 Drawing Sheets

| Line Segment # | Length(Inches) | % away from mean of 12 |
|---|---|---|
| 1 | 12 | 0 |
| 2 | 12 | 0 |
| 3 | 12 | 0 |
| 4 | 12 | 0 |
| 5 | 12 | 0 |
| 6 | 12 | 0 |
| 7 | 12 | 0 |
| 8 | 12 | 0 |
| 9 | 12 | 0 |
| 10 | 12 | 0 |
| 11 | 12 | 0 |
| 12 | 12 | 0 |
| 13 | 12 | 0 |
| 14 | 12 | 0 |
| 15 | 12 | 0 |

FIG. 5

| Line Segment # | Length(Inches) | % away from mean of 8.27 |
|---|---|---|
| 1 | 12 | 45% |
| 2 | 11 | 33% |
| 3 | 11 | 33% |
| 4 | 10 | 21% |
| 5 | 10 | 21% |
| 6 | 09 | 9% |
| 7 | 09 | 9% |
| 8 | 08 | 3% |
| 9 | 08 | 3% |
| 10 | 07 | 15% |
| 11 | 07 | 15% |
| 12 | 06 | 27% |
| 13 | 06 | 27% |
| 14 | 05 | 40% |
| 15 | 05 | 40% |

FIG. 6

HOLE LOCATION METHOD AND APPARATUS

BACKGROUND OF THE INVENTION

There are a variety of known methods for checking whether the locations or potential locations of holes in structural parts are located adequately far away from edges, fillets, and thickness changes. Often, an engineer is required to manually identify nearby edges, fillets, and thickness changes in relation to the hole, prior to determining whether the location or potential location of the hole is substantially uniform to accommodate a fastener device. This process may be difficult, timely, tedious, costly, inaccurate, and/or may experience other additional problems.

A method, and apparatus produced using the method, is needed which may solve one or more problems in one or more of the existing methods for checking the location or potential location of holes in structural parts.

SUMMARY OF THE INVENTION

In one aspect of the invention, a method is disclosed for checking at least one of a location and potential location of one or more holes in one or more structures relative to edges, fillets, and thickness changes. At least one of a location and potential location of at least one hole in at least one structure is located. A center-line of the at least one hole is determined. A radius is determined defining a circle extending around the at least one hole within which edges, fillets, and thickness changes are to be checked for. A plurality of segments around the circle are created. The segments extend beyond end surfaces defining the at least one hole. Intersecting portions of the segments are determined with respect to the at least one structure. The intersecting portions of the segments are compared. The at least one hole is flagged as being a potential problem if the intersecting portions of the segments are not within a pre-determined threshold.

In another aspect of the invention, an apparatus is provided comprising a structure having at least one fastener extending through at least one hole defined in the structure. A location of the at least one hole was approved for the at least one fastener by at least one of a computer and software. During approval, the at least one hole was located. A center-line of the at least one hole was determined. Also determined was a radius defining a circle extending around the at least one hole. A plurality of segments around the circle was created. Intersecting portions of the segments with respect to the at least one structure were determined. The intersecting portions of the segments were compared. The at least one hole was approved for said fastener after determining that the intersecting portions of the segments were within a pre-determined threshold.

In a further aspect of the invention, a computer-implemented method is provided for checking at least one of a location and potential location of one or more holes in one or more structures relative to edges, fillets, and thickness changes. At least one of a location and potential location of at least one hole is located in at least one structure. An area is determined around the at least one hole within which edges, fillets, and thickness changes are to be checked for. A plurality of segments around the area are created. The segments extend beyond end surfaces defining the at least one hole. Intersecting portions of the segments are determined which intersect with the at least one structure. The intersecting portions of the segments are compared. The at least one hole is flagged as being a potential problem if the intersecting portions of the segments are not within a pre-determined threshold.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In one or more embodiments, the invention may comprise a method for determining whether a location or potential location of a hole in a structure meets a pre-determined threshold. In some embodiments, an area around a location or potential location of a hole in a structure may be analyzed utilizing one of the methods of the invention to determine whether the area is sufficiently uniform in order for the hole to accommodate a fastener device. In other embodiments, apparatus are disclosed having one or more fastener devices extending through one or more holes in a structure. The location or potential location of the one or more holes may have been approved for insertion of the one or more fastener devices utilizing a pre-determined threshold standard under the invention.

In one embodiment of the invention, a method may be provided for checking the location or potential location of one or more holes in one or more structures relative to edges, fillets, and thickness changes in the structures. For purposes of this application, the term hole refers both to a pre-existing hole in a structure and to a potential hole in a structure, and this invention applies to both situations. The methods of the invention may utilize one or more computers or computer software to carry out any of the disclosed steps in checking the locations or potential locations of one or more holes in one or more structures.

Figure 1:
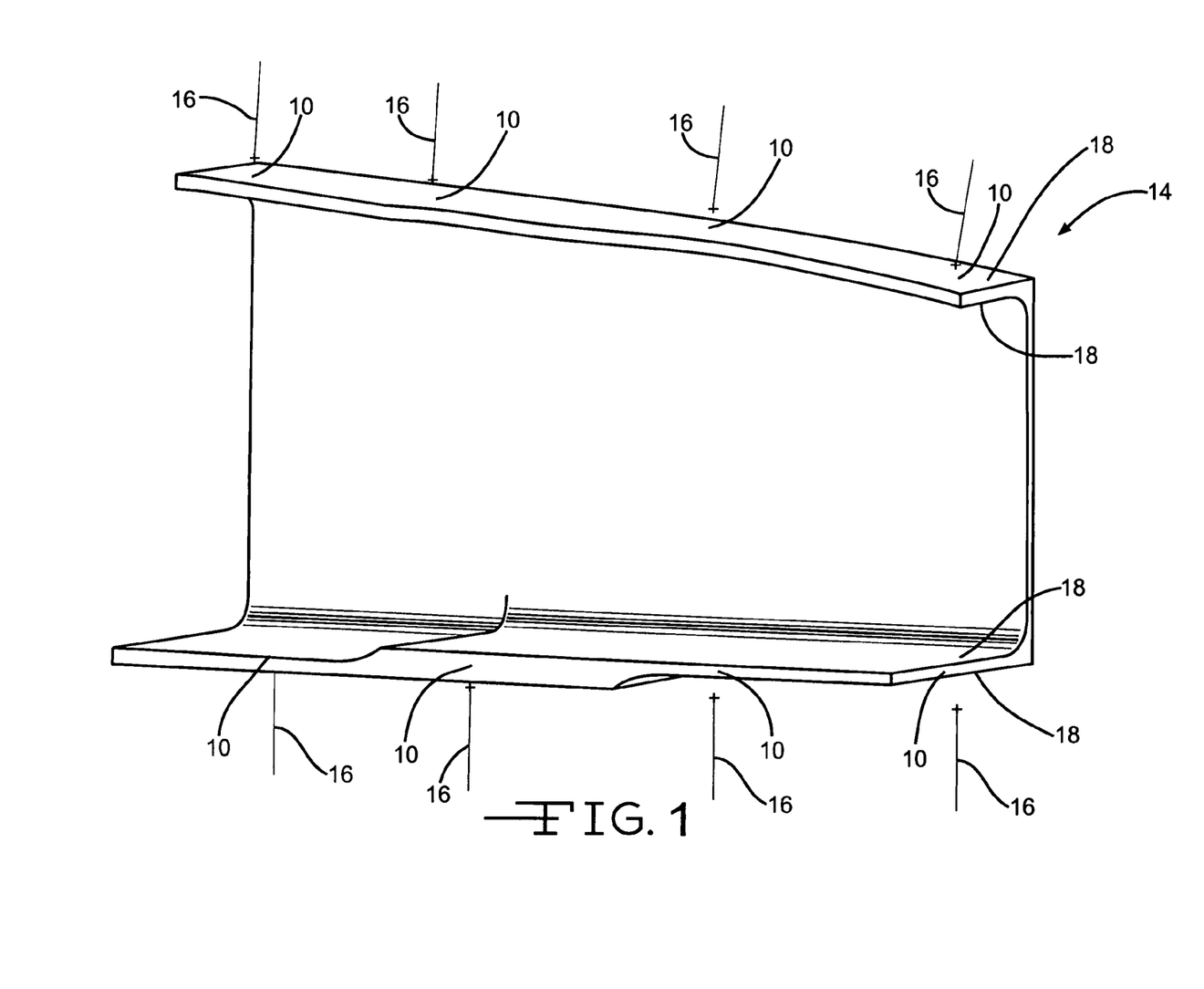
FIG. 1 is a perspective view of one embodiment of a structure to which the methods of the invention may be applied.
Figure 2:
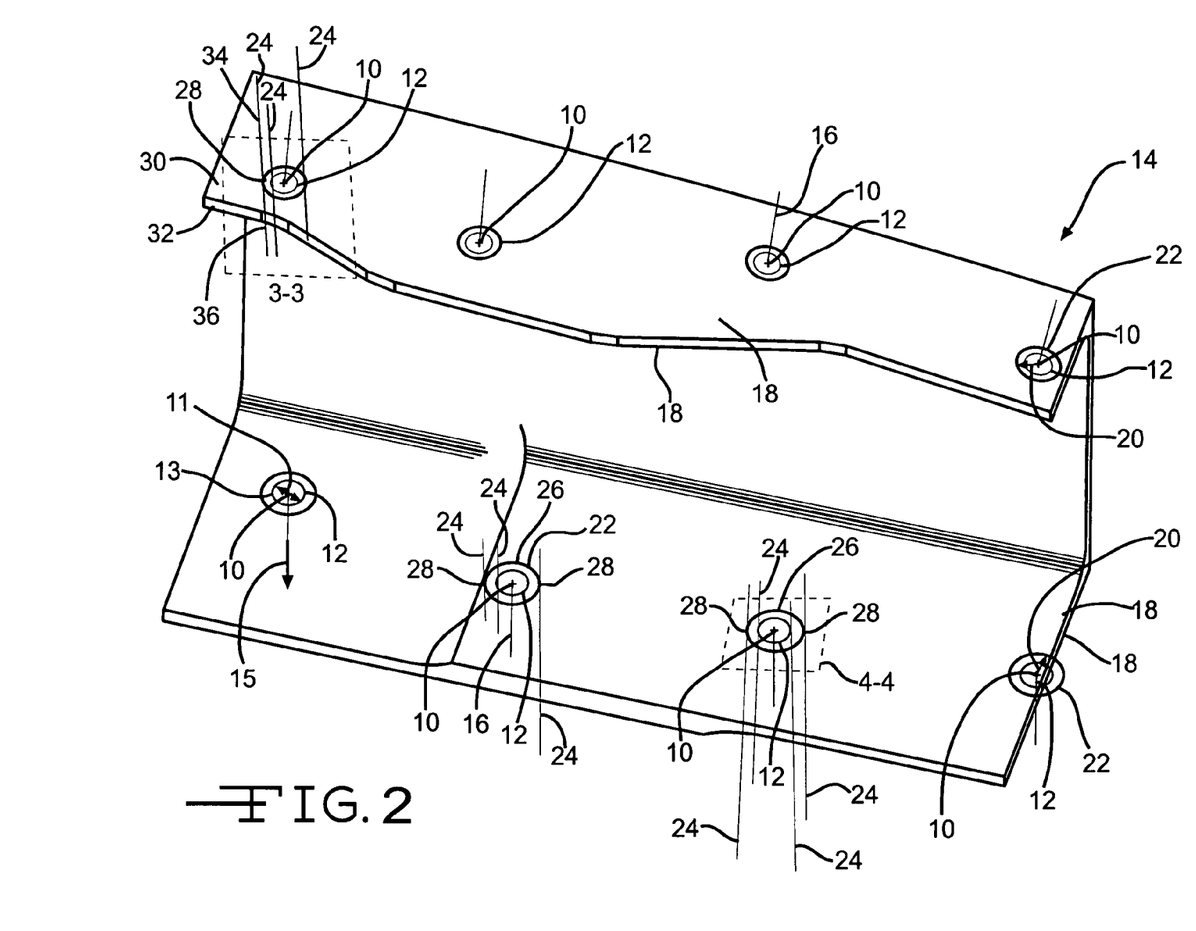
FIG. 2 is another perspective view of the embodiment shown in FIG. 1 implementing one embodiment of a method under the invention.

In one embodiment of a method under the invention, as shown in FIGS. 1 and 2, potential locations 10 for the potential insertion of holes 12 in one or more non-uniform structures 14 may be identified. The structure 14 being analyzed may comprise one or more parts of an airplane. During identification of the potential locations 10, a diameter 11 of the potential holes 12 may be determined, an entry point 13 of the potential holes 12 in the structure 14 may be determined, and/or a direction 15 of the potential holes 12 in the structure 14 may be determined. In other embodiments, other hole characteristics may be identified. In such manner, by gathering information regarding the potential holes 12, the suitability of the area into which the holes 12 may be located for the use of fastener devices, or for varying uses or devices, may be determined. In other embodiments, the structure may relate to a non-airplane application and the locations being identified in the structure may already have pre-existing holes which may be evaluated for the use of fastener devices, or for varying uses or devices.

One or more center-lines 16 extending through the centers of the potential holes 12 may be determined. Preferably, the center-lines 16 extend parallel to the axis of the holes 12 and perpendicular to end surfaces 18 defining the holes 12 in the structure 14. In other embodiments, the center-lines 16 may extend in any orientation or configuration. At least one radius 20 may be determined which defines a circle 22 extending around the potential holes 12 within which edges, fillets, and thickness changes of the structure 14 are to be checked for. The radius 20 of the circle 22 may be substantially equal to the amount of two (2) times a diameter 11 of the hole 12 plus the sum of three-one-hundreds of an inch (0.03"). This radius may be used to check for edges. In other embodiments, the radius 20 of the circle 22 may be determined utilizing varying formulas. For instance, in another embodiment, the radius 20 of the circle 22 may be substantially equal to the amount of one (1) times a diameter 11 of the hole 12 plus the sum of nine-one-hundreds of an inch (0.09"). This radius may be used to check for fillets or thickness changes. The circle 22 may be defined on an end surface 18 of the structure 14 defining the potential hole 12. In other embodiments, the area around the potential holes being checked may comprise varying radiuses, sizes, locations, configurations, and orientations.

A plurality of segments 24 may be created around the circle 22 which extend beyond end surfaces 18 defining the hole 12. In one embodiment, substantially in the range of fifteen (15) to fifty (50) segments 24 may be created around a circumference of the circle 22. In other embodiments, any number of segments 24 may be used. The segments 24 may comprise a plurality of one-directional lines distributed around a circumference 26 of the circle 22. In another embodiment, the segments 24 may comprise a plurality of areas or solid volumes, such as cylinders, rectangles, or squares, distributed around a circumference 26 of the circle 22. In still other embodiments, the segments 24 may comprise varying shapes, types, sizes, orientations, and configurations.

Intersecting portions 28 may be determined for each individual segment 24 in each hole location 10. The intersecting portions 28 may comprise the portions 28 of each segment 24 in each potential hole location 10 which intersect (or travel through the same space) with the structure 14. In one embodiment, the intersecting portions 28 may comprise the intersecting length and/or intersecting volume of the portion 28 of each segment 24 which intersects (or travels through the same space) as one or more portions of the structure 14. For example, with respect to the potential hole location 10 within the dotted box marked 3-3 in FIG. 2, the intersecting portions 28 of the line segments 24 which intersect with the structure 14 may comprise the respective intersecting lengths of the portions 28 of each line segment 24 which lie between the surface 30 and the surface 32 of the structure 14. The portions 34 of the line segments 24 above the surface 30 and the portions 36 of the line segments 24 below the surface 32 do not comprise intersecting portions 28. The same process may be followed to determine the intersecting portions 28 in each potential hole location.

Figure 3:
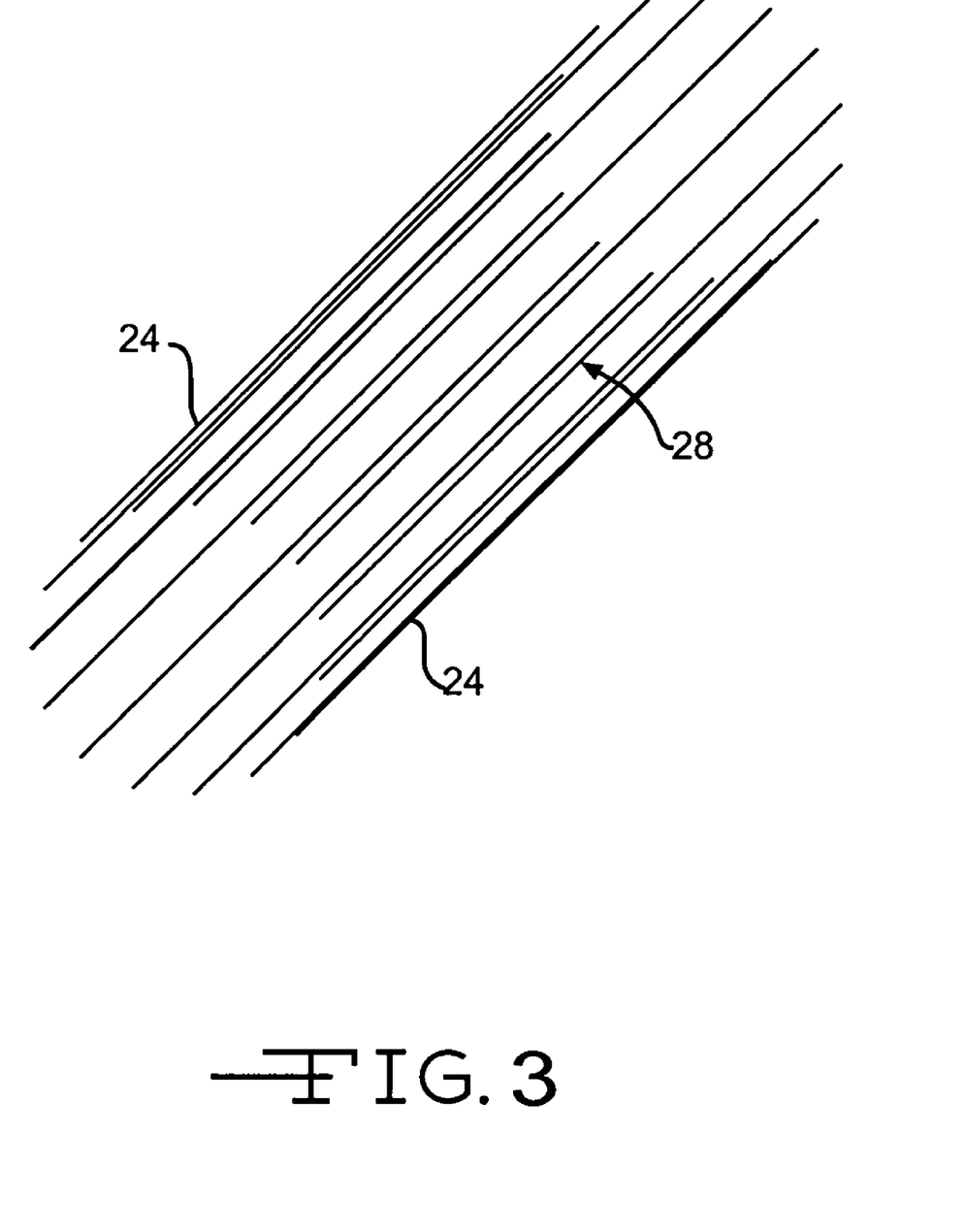
FIG. 3 depicts a perspective view, in the potential hole location depicted by the dotted box marked 3-3 in FIG. 2, of only the intersecting portions of each line segment which intersect with the structure.
Figure 4:
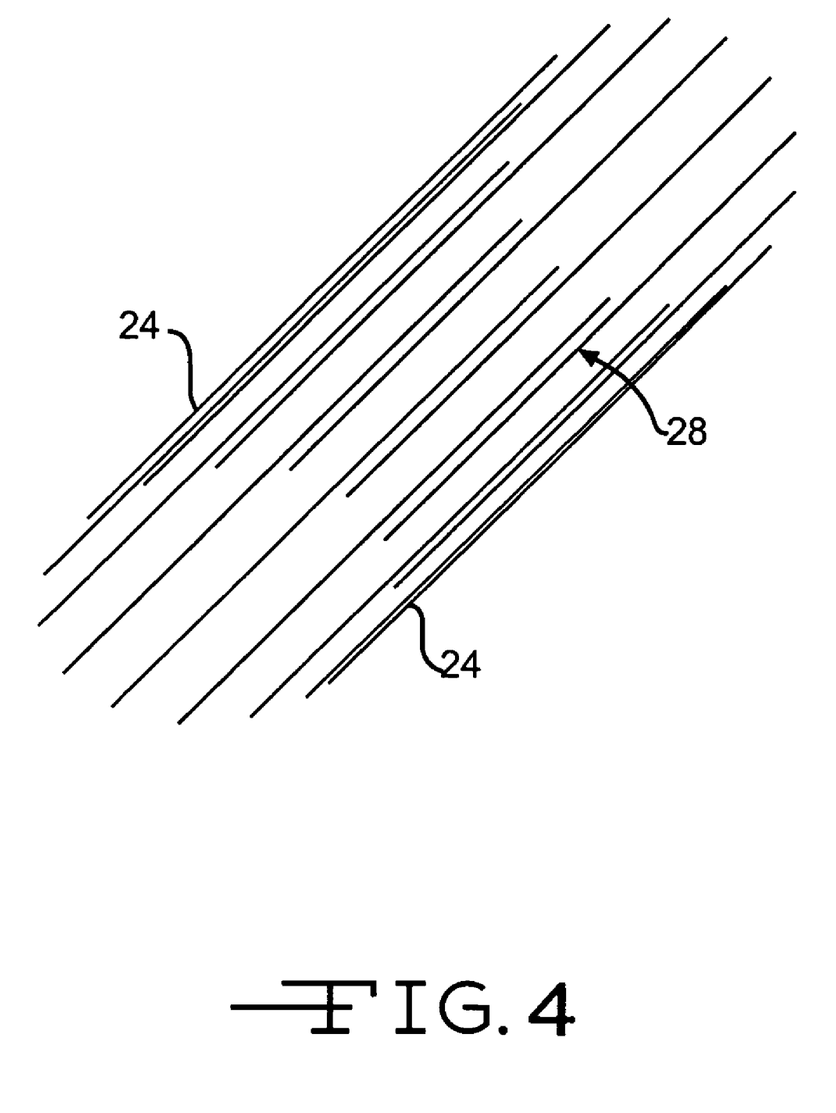
FIG. 4 depicts a perspective view, in the potential hole location depicted by the dotted box marked 4-4 in FIG. 2, of only the intersecting portions of each line segment which intersect with the structure.

FIG. 3 represents a perspective view, in the potential hole location depicted by 3-3 in FIG. 2, of only the intersecting portions 28 of each line segment 24 which intersect with the structure 14. Similarly, FIG. 4 represents a perspective view, in the potential hole location depicted by 4-4 in FIG. 2, of only the intersecting portions 28 of each line segment 24 which intersect with the structure 14. In embodiments utilizing solid volumes distributed around the circle rather than lines, the intersecting portions may comprise the respective volumes of the portions of each solid volume which fall between surfaces of the structure. In other embodiments, the intersecting portions may be determined based on varying criteria.

Figure 5:
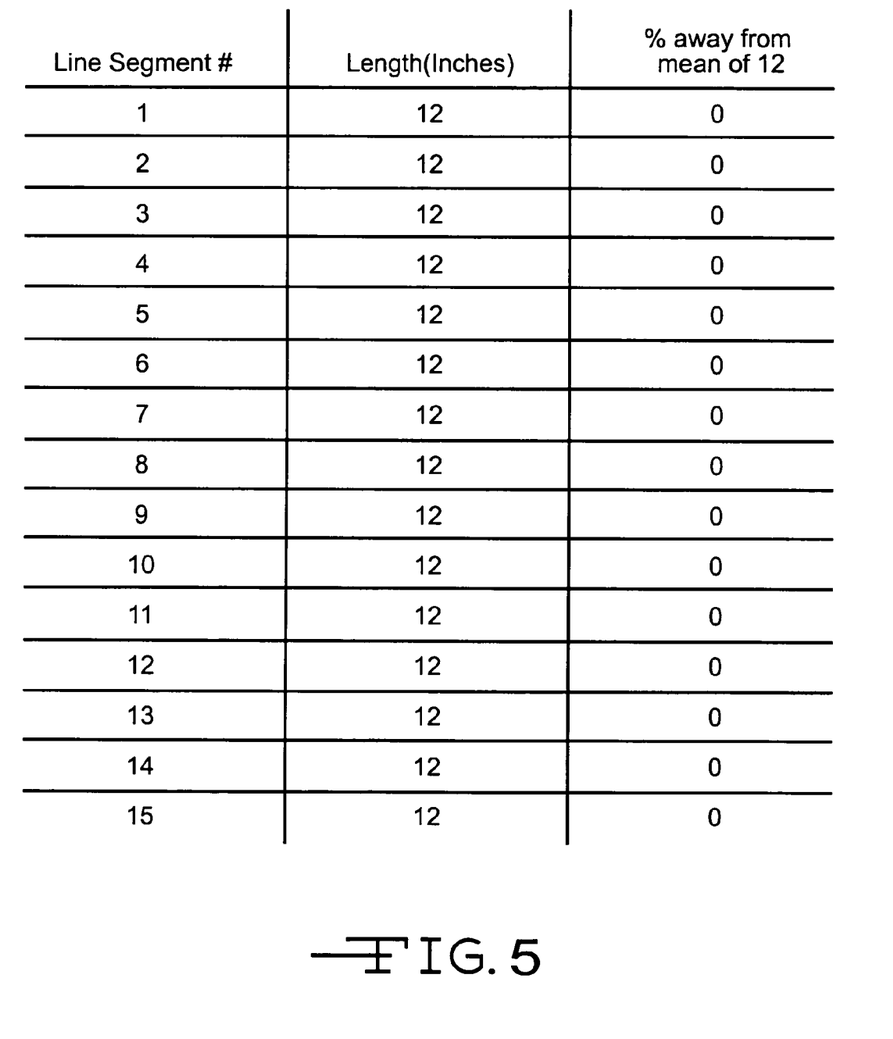
FIG. 5 shows a table depicting the lengths of each of the fifteen intersecting portions of the fifteen line segments in the potential hole location depicted by the dotted box marked 3-3 in FIG. 2.
Figure 6:
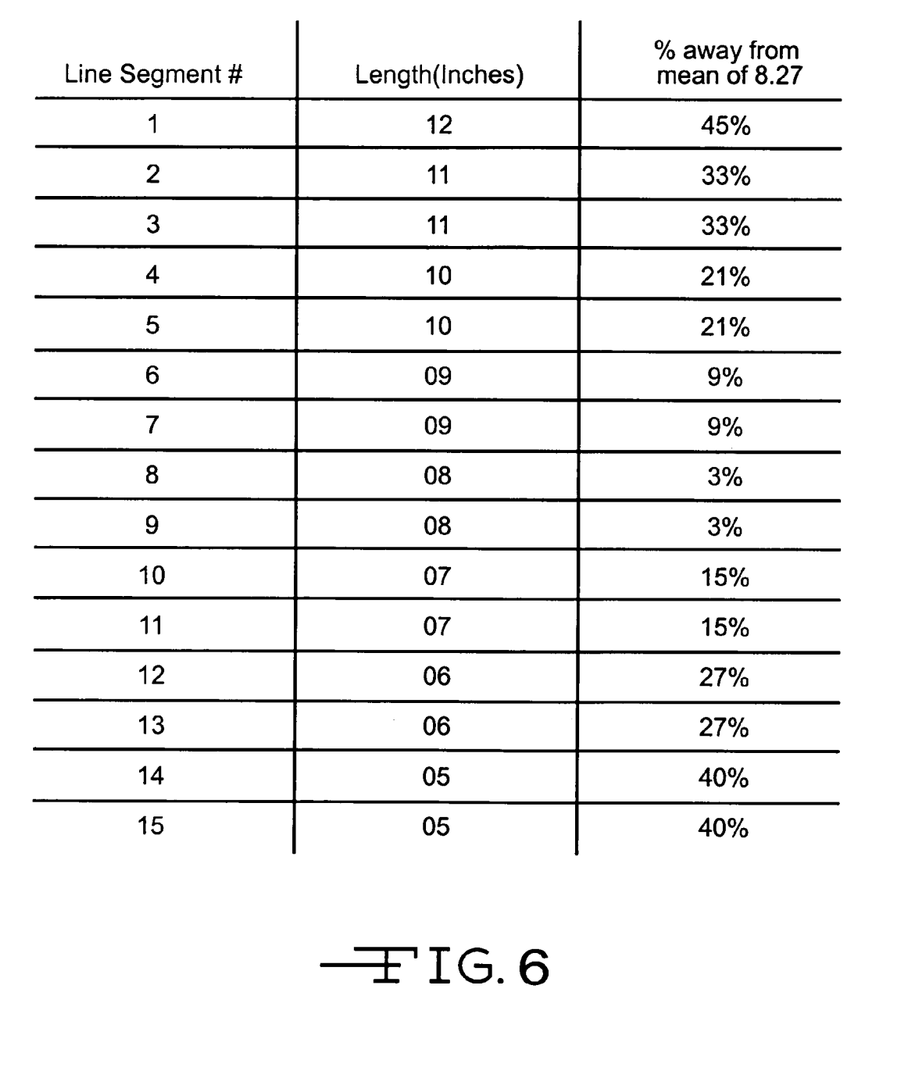
FIG. 6 shows a table depicting the lengths of each of the fifteen intersecting portions of the fifteen line segments in the potential hole location depicted by the dotted box marked 4-4 in FIG. 2.

The intersecting portions 28 of each of the segments 24 in each potential hole location 10 may be compared with respect to one-another. For instance, in the embodiment in which the intersecting portions 28 comprise the respective lengths of each line segment 24 intersecting with the structure 14, each intersecting length of each respective line segment 24 may be compared relative to one another. As an example, FIG. 5 shows a table depicting the lengths of each of the fifteen intersecting portions 28 of the fifteen line segments 24 in the potential hole location depicted by 3-3 in FIG. 2. Similarly, FIG. 6 shows a table depicting the lengths of each of the fifteen intersecting portions 28 of the fifteen line segments 24 in the potential hole location depicted by 4-4 in FIG. 2. These intersecting portions 28 in each potential hole location 10 may be checked against one another in order to determine the uniformity of the structure 14 in each hole location. In other embodiments utilizing solid volumes rather than lines, the intersecting volumes of each segment, with respect to the structure, in each potential hole location may be compared relative to one-another to determine the uniformity of the structure in each hole location.

Upon comparing each of the intersecting portions 28 in each potential hole location 10, if the intersecting portions 28 of the segments 24 are not within a pre-determined threshold, the particular hole location 10 may be flagged as a potential problem. The pre-determined threshold may comprise requiring each segment 24 to be within a specified percentage of one another. For instance, in one embodiment where the pre-determined threshold requires that each segment 24 in each potential hole location 10 be within ten (10) percent of the mean (average) of all the measured line-segments, the table shown in FIG. 5 demonstrates that the hole location depicted by 3-3 in FIG. 2 would not be flagged as a potential problem. However, in the same embodiment, the table shown in FIG. 6 demonstrates that the hole location depicted by 4-4 in FIG. 2 would be flagged as a potential problem due to many of the segments exceeding the ten (10) percent threshold. In other embodiments, the threshold may comprise varying pre-determined percentages of the median, mean, or mode value calculated for the segments 24 in each potential hole location 10. In still other embodiments, the threshold determination may be made utilizing differing criteria.

The methods of the invention may be implemented, utilizing a computer, software, or other type of device, to check the suitability of a hole location and/or potential hole location in a structure for one or more fastener devices. In such manner, the determination of whether a hole location and/or potential hole location is suitable for a fastener device may become an automated process implemented by a computer.

In another embodiment under the invention, an apparatus may be provided which comprises a structure having one or more fasteners extending through one or more holes defined in the structure. The location of the one or more holes may have been approved for use of the one or more fasteners utilizing any of the above disclosed embodiments under the invention. For instance, the location of the one or more holes may have been approved for use of the one or more fasteners utilizing at least one of a computer and software which located the holes; determined a center-line of the holes; determined a radius defining a circle extending around each hole; created a plurality of segments around each circle; determined intersecting portions of the segments with respect to the structure; compared the intersecting portions of the segments; and approved each hole for fastener device usage after determining that the intersecting portions of the segments were within pre-determined thresholds.

It should be understood, of course, that the foregoing relates to exemplary embodiments of the invention and that modifications may be made without departing from the spirit and scope of the invention as set forth in the following claims.

We claim:

1. A method of checking at least one of a location and potential location of one or more holes in one or more structures relative to edges, fillets, and thickness changes comprising the steps of:
    locating at least one of a location and potential location of at least one hole in at least one structure;
    determining a center-line of said at least one hole;
    determining a radius defining a circle extending around said at least one hole within which edges, fillets, and thickness changes are to be checked for;
    creating a plurality of segments around the circle, wherein said segments extend beyond end surfaces defining said at least one hole;
    determining intersecting portions of said segments with respect to said at least one structure;
    comparing said intersecting portions of said segments; and
    flagging said at least one hole as being a potential problem if said intersecting portions of said segments are not within a pre-determined threshold.

2. The method of claim 1 wherein said at least one structure comprises at least one part of an airplane.

3. The method of claim 1 wherein the step of locating at least one of a location and potential location of at least one hole in at least one structure comprises identifying one or more of a diameter of said at least one hole, a direction of said at least one hole, and an entry point of said at least one hole.

4. The method of claim 1 wherein the step of determining a center-line of said at least one hole comprises determining a center-line extending in a parallel direction with respect to said at least one hole.

5. The method of claim 1 wherein the step of determining a radius defining a circle extending around said at least one hole within which edges, fillets, and thickness changes are to be checked for comprises determining a radius substantially equivalent to the amount of 2 times a diameter of said at least one hole plus the sum of 0.03 inches.

6. The method of claim 1 wherein the step of creating a plurality of segments around the circle comprises creating a plurality of line segments around a circumference of the circle.

7. The method of claim 1 wherein the step of creating a plurality of segments around the circle comprises creating a plurality of solid volumes around a circumference of the circle.

8. The method of claim 1 wherein the step of determining intersecting portions of said segments with respect to said at least one structure comprises determining at least one of an intersecting length and an intersecting volume of said segments with respect to said at least one structure.

9. The method of claim 8 wherein the step of comparing said intersecting portions of said segments comprises comparing at least one of said intersecting length and said intersecting volume of said segments with respect to said at least one structure.

10. The method of claim 1 wherein the step of flagging said at least one hole as being a potential problem if said intersecting portions of said segments are not within a pre-determined threshold comprises flagging said at least one hole as a potential problem is said intersecting portions of said segments are not within a specified percentage of one another.

11. The method of claim 1 wherein the method is utilized to check at least one of the location and potential location of a plurality of holes.

12. The method of claim 7 wherein said plurality of solid volumes comprises a plurality of at least one of substantially tubular solid volumes and substantially rectangular solid volumes.

13. The method of claim 1 wherein said step of creating a plurality of segments around the circle comprises creating substantially in the range of 15 to 50 segments around a circumference of the circle.

14. The method of claim 1 wherein said method is implemented utilizing at least one of a computer and software.

15. The method of claim 1 wherein said method is utilized to determine whether at least one of said location and said potential location of said one or more holes in said one or more structures is suitable for one or more fastener devices.

16. An apparatus comprising a structure having at least one fastener extending through at least one hole defined in said structure, wherein a location of said at least one hole was approved for said at least one fastener by at least one of a computer and software which located said at least one hole, determined a center-line of said at least one hole, determined a radius defining a circle extending around said at least one hole, created a plurality of segments around the circle, determined intersecting portions of said segments with respect to said at least one structure, compared said intersecting portions of said segments, and approved said at least one hole for said fastener after determining that said intersecting portions of said segments were within a pre-determined threshold.

17. The apparatus of claim 16 wherein said apparatus comprises a portion of an airplane.

18. The apparatus of claim 16 wherein said determined radius was substantially equivalent to the amount of 2 times a diameter of said at least one hole plus the sum of 0.03 inches.

19. The apparatus of claim 16 wherein said plurality of created segments around said circle comprised at least one of a plurality of created line segments and a plurality of created solid volumes.

20. The apparatus of claim 16 wherein said determined intersecting portions of said segments with respect to said at least one structure comprised at least one of a determined intersecting length and a determined intersecting volume.

21. A computer-implemented method of checking at least one of a location and potential location of one or more holes in one or more structures relative to edges, fillets, and thickness changes comprising the steps of:

locating at least one of a location and potential location of at least one hole in at least one structure;

determining an area around said at least one hole within which edges, fillets, and thickness changes are to be checked for;

creating a plurality of segments around said area, wherein said segments extend beyond end surfaces defining said at least one hole;

determining intersecting portions of said segments which intersect with said at least one structure;

comparing said intersecting portions of said segments; and flagging said at least one hole as being a potential problem if said intersecting portions of said segments are not within a pre-determined threshold.

22. The computer-implemented method of claim 21 wherein said structure comprises at least one part of an airplane.

* * * * *